Feb. 19, 1952 L. J. F. ELL 2,586,627
BEARING
Filed Oct. 30, 1946
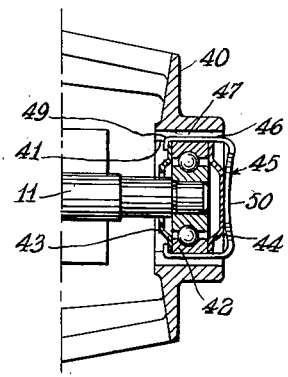
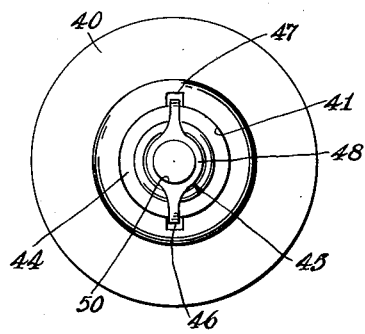
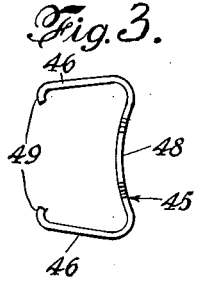
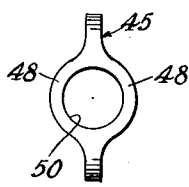
INVENTOR.
Lars Johan Faith Ell
BY
Ed Fenander
his ATTORNEY.

Patented Feb. 19, 1952

2,586,627

UNITED STATES PATENT OFFICE 2,586,627

BEARING

Lars Johan Faith Ell, Stockholm, Sweden, assignor to Electrolux Corporation, Old Greenwich, Conn., a corporation of Delaware Application October 30, 1946, Serial No. 706,765
In Sweden November 1, 1945

4 Claims. (Cl. 308—189)

This invention relates to bearings, such as a ball bearing, for shafts and the like and more particularly to bearings having one or two cover members pressed resiliently by a resilient member, such as a spring, disposed on one face of the bearing against the respective adjacent face of a bearing member, such as an outer bearing ring.

The purpose of such springs is to regulate the pressure exerted by the cover member on the bearing member and to distribute said pressure as uniformly as possible over the periphery of said bearing member.

The object of the present invention is to provide a simplified construction of such bearings and in particular to simplify the connecting means for the bearing and its cover member or members.

According to the present invention in a bearing of the kind above described the resilient member disposed on one face of the bearing extends to the opposite face and engages the bearing member at said opposite face and/or the cover member forced against said bearing member on said opposite face.

The invention also comprises a bearing unit for shafts or the like which includes cover members disposed one on each face of the bearing and a resilient member (spring) contacting one cover member so as to press the latter against a bearing member, such as the outer race, and passing across the bearing to engage the cover member disposed on the opposite face so as to hold the cover members together with resilient pressure.

To facilitate assembly the construction is preferably such that the spring, the bearing and the cover member or members can be united by pushing the parts together axially. In addition the spring may be so constructed as to form a guide for the cover member, thus ensuring play between the peripheral edge of the cover member and the seat in which the bearing is supported and thus allowing axial displacement of the bearing within the seat.

The invention will be hereinafter more fully described with reference to the embodiment thereof shown by way of example in the accompanying drawings, in which:

Fig. 1 shows in section the rear portion of a motor housing provided with one embodiment of the ball bearing mounting according to the invention;

Fig. 2 shows the bearing portion of the same viewed from the right in Fig. 1;

Figs. 3 and 4 show a spring stirrup forming part of the device, in side and end elevation respectively.

Referring to the construction shown in Figs. 1 to 4, the motor housing 40 in the form of a casting is provided with a seat 41 for a ball bearing, the outer ring of which is designated by 42. The inner and outer bearing covers 43 and 44 are held in engagement with the outer ring 42 by means of a spring stirrup 45, having arms 46 disposed in axial grooves 47 in the bearing seat 41. In this case the spring stirrup has its central portion 48 bearing against the center of the outer cover 44, while the inwardly bent ends 49 of the arms 46 bear against the edge portions of the inner cover 43.

The bearing, the cover members thereof and the spring stirrup thus form a unit, the elements of which are held together by the spring stirrup and which is displaceable in the bearing seat. Rotation of said unit relative to the seat is, however, prevented by the resilient arms 46 being constrained within the grooves 47. The arms 46 are preferably shaped so as to form abutment faces (guiding means) for the cover members and to guide the latter so as to ensure sufficient play between the peripheral edges of the cover members and the seat. The spring stirrup, which as illustrated, is disposed on the outer face of the bearing is formed with a central aperture 50 in order that the same stirrup should be capable of being arbitrarily disposed either at the outside of the bearing or at its inside.

As will be clear from the figures, the ball bearing mounting may be made very short, which is dependent partly on the bearing covers being manufactured of sheet metal and partly due to the fact that the bearing and the cover members are held together by the device described. This small length of the ball bearing mounting is of particular value for small-size motors.

The above-described embodiment is described merely by way of example and without limitation. The device may for example also be made so that only one bearing cover engages with the ball bearing ring while the other cover member engages the seat at a sufficient distance from the ball bearing to permit axial displacement of the latter within the seat. Further the resilient member may be so formed as to serve also as a ball bearing cover.

I claim:

1. In a bearing assembly, an outer race, a circular bearing cover of a diameter substantially the same as that of said outer race and having an annular edge portion abutting one end of said outer race, and a clamping member having a central portion engaging the central portion of said cover and a plurality of arms extending from said central portion axially in contact with the circular edge of said cover and the outer peripheral surface of said race, said arms having inwardly extending projections embracing the other end of said outer race.

2. In a bearing assembly, an outer race, a first circular bearing cover having an annular edge portion abutting one end of said race, a second circular bearing cover having an annular edge portion abutting the opposite end of said race, the diameter of each of said covers being substantially the same as that of said outer race, and a clamping member having a central portion engaging the central portion of one of said covers and having a plurality of arms extending from said central portion axially in contact with the circular edge of each cover and the outer peripheral surface of said race, said arms having inwardly extending projections engaging the annular edge portion of the other of said covers.

3. In a bearing asesmbly, an outer race, a circular bearing cover of a diameter substantially the same as that of said outer race and having an annular edge portion abutting one end of said outer race, and a clamping member having an annular central portion engaging the central portion of said cover and a plurality of arms connected to said annular portion and extending in an axial direction in contact with the circular edge of said cover and the outer peripheral surface of said race, said arms having inwardly extending projections embracing the other end of said outer race.

4. In a device of the class described, a bearing mount comprising a supporting member formed with a circular opening, the surface bounding said opening being formed with a plurality of axially extending grooves, an outer race displaceably supported in said opening, a bearing cover having an edge portion abutting one end of said outer race, and a clamping member having a central portion engaging the central portion of said cover and a plurality of arms extending from said central portion through said grooves and having inwardly extending projections embracing the other end of said race, said arms cooperating with said grooves to prevent rotation of said outer race in said opening.

LARS JOHAN FAITH ELL.

REFERENCES CITED

The following references are of record in the file of this patent:

UNITED STATES PATENTS

| Number | Name | Date |
|---|---|---|
| 1,386,570 | Heyman | Aug. 2, 1921 |
| 1,944,291 | Lundvall | Jan. 23, 1934 |
| 1,995,838 | Buckwalter | Mar. 26, 1935 |

FOREIGN PATENTS

| Number | Country | Date |
|---|---|---|
| 118,503 | Austria | Mar. 15, 1930 |